United States Patent [19]

Markley et al.

[11] Patent Number: 4,676,598

[45] Date of Patent: Jun. 30, 1987

[54] MULTIPLE REFERENCE LASER BEAM APPARATUS

[75] Inventors: Theodore J. Markley, Vandalia; Richard J. Omlor, Englewood; William K. Vatter, Springfield; Mark D. Sobottke, Kettering, all of Ohio

[73] Assignee: Spectra-Physics, Inc., San Jose, Calif.

[21] Appl. No.: 734,325

[22] Filed: May 15, 1985

[51] Int. Cl.[4] .................... G02B 27/14; G01C 15/00
[52] U.S. Cl. ...................................... 350/171; 33/286
[58] Field of Search .............. 350/484, 6.2, 6.4, 6.5; 356/138, 148, 152, 153, 247, 248; 33/281, 285, 286, 290

[56] References Cited

U.S. PATENT DOCUMENTS

| | | | |
|---|---|---|---|
| 3,796,496 | 3/1974 | Appler et al. | 356/153 |
| 3,966,328 | 6/1976 | Wiklund | 350/6.4 |
| 4,031,629 | 6/1977 | Paluck | 33/290 |
| 4,035,084 | 7/1977 | Ramsay | 356/152 |
| 4,062,634 | 12/1977 | Rando et al. | 356/248 |

*Primary Examiner*—John K. Corbin
*Assistant Examiner*—Vincent J. Lemmo
*Attorney, Agent, or Firm*—Killworth, Gottman, Hagan & Schaeff

[57] ABSTRACT

Apparatus for projecting a laser beam to provide simultaneously a stationary reference beam and a moving reference beam, which rotates in a plane normal to the stationary reference beam, includes a beam diverting arrangement for intercepting a primary beam and for splitting the beam into the two reference beams. The beam diverting arrangement includes first and second deflecting elements which deflect the beam by 90° with respect to the primary beam. A portion of the primary beam, striking the first deflecting element, passes through the element and is shifted slightly by refraction. This shift is compensated by a third beam deflecting element which is fully transmissive, and which refracts the stationary reference beam into alignment with the primary beam. By cutting the first and third deflection elements from the same sheet of material and reorienting the elements appropriately, slight deviation from parallelism in the opposing surfaces of the sheet of material are compensated.

14 Claims, 5 Drawing Figures

MULTIPLE REFERENCE LASER BEAM APPARATUS

BACKGROUND OF THE INVENTION

The present invention relates to a method and apparatus for providing reference laser beams and, more particularly, to such a method and apparatus in which two such beams simultaneously define a reference line and an orthoganal reference plane.

Laser beam systems have been employed in numerous surveying and construction applications. In one such system a laser beam projector provides a rotating laser beam which initially establishes a reference plane. In use, the projector may, for example, be mounted at the desired height of a hanging ceiling in a building under construction. The beam is rotated in a horizontal plane to assist the workers in determining the proper height for the ceiling throughout the room. The rotating laser beam provides a continuous, visible plane of light that creates a constant horizontal benchmark of elevation over the entire work area. Additionally, it allows the workers to check for low duct work, sprinklers, and other obstructions before setting the support grid for the ceiling. Such a horizontal reference plane is also advantageous in constructing raised access flooring.

Typically, the laser projector can be positioned to provide a vertical reference plane of light, or a plane of light in other orientations. A laser projector of this type can be used for laying out overhead drop walls and bulkheads, and in other construction operations. Other laser projectors of a type producing a stationary reference laser beam have been used to provide a plumb line of light as a visible reference beam for plumbing elevator shafts, highrise vertical control, and slip forming.

U.S. Pat. No. 4,062,634, issued Dec. 13, 1977, to Rando et al; U.S. Pat. No. 4,035,085, issued July 12, 1977, to Ramsay; and U.S. Pat. No. 4,031,629, issued June 28, 1977, to Paluck, all disclose rotating laser beam devices. In each device, a generally horizontal rotating laser beam is produced by projecting a primary laser beam generally upward and then deflecting the beam by 90° within a pentaprism or penta-mirror assembly. The pentaprism assembly is rotated about a vertical axis to cause the horizontal beam to rotate. In the past, some laser projectors have included a removable pentaprism assembly. With such a device, the plane defined by the rotating beam could be aligned with a building structure, for example such as a wall, and the pentaprism assembly could thereafter be removed to produce a reference line normal to the wall. While such a laser projector is exceptionally useful, removal of the pentaprism assembly is somewhat cumbersome, and produces the risk that the alignment of the projector may be disturbed slightly during this operation, resulting in inaccuracies.

It is seen, therefore, that there is a need for a laser projector device which produces a stationary reference beam and a rotating reference beam perpendicular thereto, in which pentaprism assembly removal is not required.

SUMMARY OF THE INVENTION

Apparatus for projecting a light beam such as a laser beam to provide a plurality of reference beams comprises a means for providing a primary laser beam, and beam diverting means for intercepting the primary beam and permiting a portion of the primary beam to pass therethrough as a stationary reference beam. The beam diverting means simultaneously diverts the rest of the primary beam in a direction which is substantially perpendicular to the initial path of the primary beam. A means for rotating the beam diverting means is provided, whereby the diverted portion of the primary beam rotates about an axis defined by the stationary reference beam, and thereby produces a moving reference beam defining a plane which is noraml to the stationary reference beam.

The beam diverting means comprises a first beam deflecting element, defining a first reflection surface oriented at an angle with respect to the initial path of the primary path, for reflecting a part of the primary beam. The beam diverting apparatus also comprises a second beam deflecting element, defining a second reflection surface oriented at an angle of approximately 45° with respect to the first reflection surface. The second beam deflecting element reflects the part of the primary beam received from the first element in a direction substantially perpendicular to the initial path of the primary beam. The first element is partially reflective and partially transmissive, such that a portion of the primary beam passes therethrough as the stationary reference beam. The beam diverting means may further comprise a third beam deflecting element which is substantially transmissive, and which is positioned in the path of the stationary reference beam to compensate for error in the stationary reference beam position produced by the first element.

The third, beam deflecting element may define a pair of substantially parallel surfaces, coated with a non-reflective coating to enhance transmissivity, through which the stationary reference beam passes. The parallel surfaces may be oriented at an angle with respect to the first reflection surface. The first and third beam deflecting elements are cut from the same sheet of material and reoriented after cutting by rotation of the third beam deflecting element with respect to the first beam deflecting element by approximately 180° in the plane of the pair of substantially parallel surfaces. By this arrangement, error in beam direction produced by a slight wedge in the sheet of material is compensated.

A method of providing a plurality of reference beams comprises the steps of:

(a) providing a primary light beam, such as a laser beam;

(b) diverting a portion of the primary light beam in a direction which is substantially perpendicular to the primary light beam, while permitting the rest of the primary light beam to continue in its original direction as a stationary reference beam; and (c) simultaneously rotating the diverted portion of the primary light beam to provide a moving reference beam which defines a plane substantially normal to the stationary reference beam.

The step of diverting a portion of the primary laser beam includes the steps of positioning a partially transmissive mirror in the path of the primary laser beam to reflect a portion of the primary laser beam, while permitting the rest of the primary laser beam to pass therethrough as the stationary reference beam, and correcting for positional error in the stationary reference beam produced by the partially transmissive mirror by positioning a fully transmissive element, having plane parallel surfaces, in the path of the stationary reference beam.

The partially transmissive mirror and the fully transmissive element are preferably cut from the same sheet of material, and then reoriented after cutting by rotation of the fully transmissive element with respect to the partially transmissive mirror by approximately 180° in the plane of the parallel surfaces. By this approach, error in beam direction produced by a light wedge in the sheet of material is compensated. The partially transmissive mirror is approximately 70 percent reflective and 30 percent transmissive.

Accordingly, it is an object of the present invention to provide a method and apparatus for projecting a stationery reference beam and, simultaneously, projecting a moving reference beam defining a plane which is normal to the stationary reference beam; to provide such a method and apparatus in which the moving reference beam rotates about an axis aligned with the stationary reference beam; to provide such a method and apparatus in which a portion of a primary laser beam is diverted to form the moving reference beam, while the non-diverted portion of the primary laser beam forms the stationary reference beam; to provide such a method and apparatus in which the primary laser beam strikes a beam deflecting element which is partially reflective and partially transmissive to separate the primary laser beam into two beams; to provide such a method and apparatus in which an additional deflecting element is positioned in the path of the stationary reference beam to correct for error in the stationary reference beam position caused by refraction by the first deflecting element; and to provide such a method and apparatus in which the first beam deflecting element and the additional beam deflecting element are cut from the same sheet of material and then reoriented to compensate for any slight wedge in the sheet.

DETAILED DESCRIPTION OF THE PREFERRED EMBODIMENT

Figure 1:
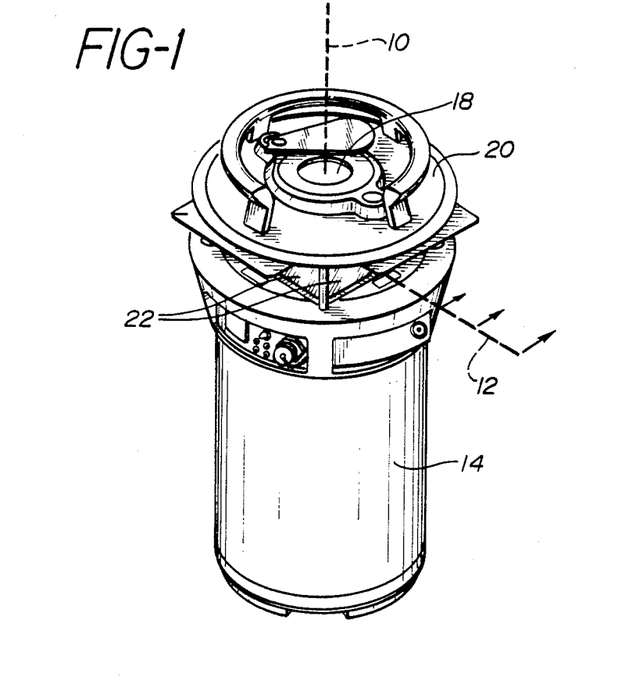
FIG. 1 is a perspective view, illustrating apparatus according to the present invention for producing reference laser beams.

Reference is made to FIG. 1 of the drawings which illustrates generally apparatus for simultaneous projection of two reference laser beams, constructed in accordance with the present invention. This apparatus is similar in many respects to that disclosed in U.S. Pat. No. 4,062,634, issued Dec. 13, 1977, Rando et al, which is incorporated by reference herein. The present invention and the Rando et al device both produce rotating laser beams which define reference planes of light for use in checking or measuring elevations, grade, dimensions from offset lines, and the like. The present invention, however, provides both a stationary reference beam 10, and a moving reference beam 12 defining a plane which is normal to the beam 10. Housing 14 includes a laser which provides a primary laser beam directed generally vertically upward. The precise direction of the primary laser beam is adjusted by the operator of the apparatus indendence upon the desired orientation of the references beams 10 and 12. Apparatus for leveling the device and adjusting the direction of the primary beam is disclosed in Rando et al.

Figure 2:
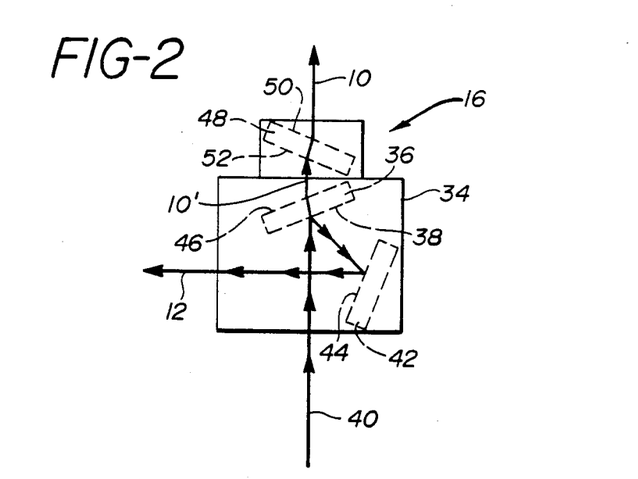
FIG. 2 is a schematic side view of the beam diverting means.
Figure 3:
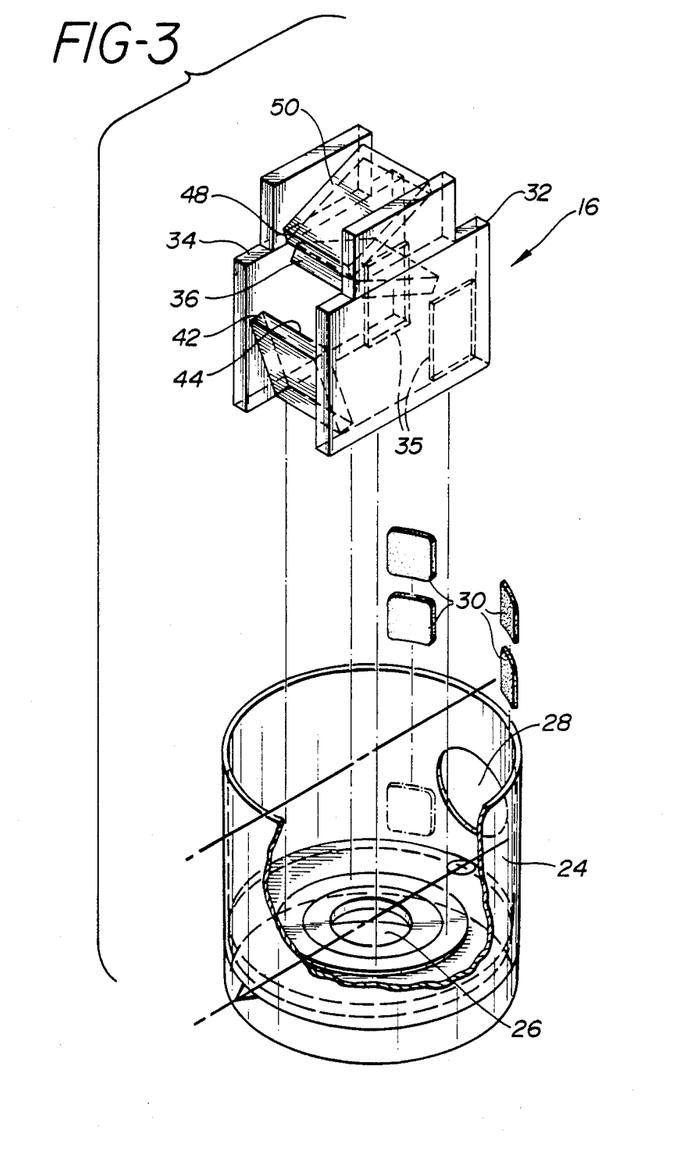
FIG. 3 is an exploded perspective view of the beam diverting means.

A beam diverting means 16 (FIGS. 2 and 3) intercepts the primary beam and permits a portion of the primary beam to pass therethrough. This portion of the primary beam emerges through opening 18 in cap plate 20 as the stationary reference beam 10. The beam diverting means simultaneously diverts the rest of the primary beam in a direction which is substantially perpendicular to the initial path of the primary beam, thus causing the beam to emerge through one of the glass panels 22 which surround the beam diverting means 16. As seen in FIG. 3, the beam diverting means is mounted in casing 24 which defines an opening 26 for entrance of the primary laser beam and an opening 28 for exit of the moving reference beam. Casing 24 further includes weights 30 which balance the casing and enhance smooth rotation thereof. The casing 24 in conjunction with a drive motor M and a linkage 25 connected thereto, contained within housing 14, provide a means for rotating the beam diverting means 16 whereby the portion of the primary beam which is diverted is rotated about an axis defined by the stationary reference beam 10.

The beam diverting means includes a number of beam deflecting elements extending between a pair of side plates 32 and 34 to which are attached balance weights 35. A first beam deflecting element 36 comprises a first mirror defining a first reflection surface 38 oriented at an angle with respect to the initial path of primary beam 40. The first beam deflecting element 36 reflects a part of the primary beam 40 toward a second beam deflecting element 42 which defines a second reflection surface 44. Reflection surface 44 is oriented at an angle of approximately 45° with respect to the first reflection surface 38 such that it further reflects the part of the primary beam directed to it by mirror 36 in a directio substantially perpendicular to the initial path of the primary beam 40.

The first element 36 is partially reflective and partially transmissive such that a portion of the primary beam passes therethrough as 10' to become the stationary reference beam 10. Element 36 is preferably made of glass with surface 38 having a coating making it 70% reflective and 30% transmissive to light at the wavelength of the primary beam when impinging upon surface at an angle of incidence of approximately 22½°. As may be noted in FIG. 2, since the first reflection surface 38 and the second reflection surface 46 of the element 36 are at an oblique angle to the incident primary beam 40, the transmissive portion 10' of the primary beam is refracted entering and emerging from the element 36 and is thereby shifted laterally to the left, as seen in FIG. 2, such that it is generally parallel to but out of alignment with beam 40. To compensate for this mispositioning, the beam diverting means 16 further comprises a third beam deflecting element 48 which is substantially transmissive and which defines a pair of substantially parallel surfaces 50 and 52. Surfaces 50 and 52 are oriented at an angle (here shown as 45°) with respect to the first reflection surface 38 and are coated with a non-reflective coating to enhance the transmissivity of the element 48. As may be seen in FIG. 2, element 48, also made of glass, effects refraction in a manner opposite to element 36 and produces a lateral shift to the right which returns beam 10' into alignment with primary beam 40.

Figure 4:
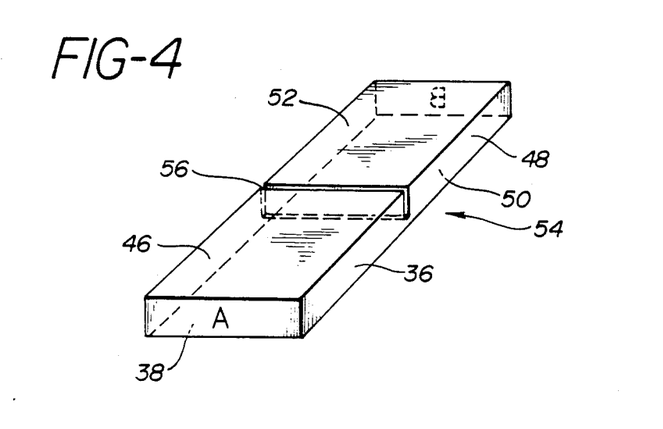
FIG. 4 is a perspective view of a sheet of material from which the first and third beam deflecting elements are cut.
Figure 5:
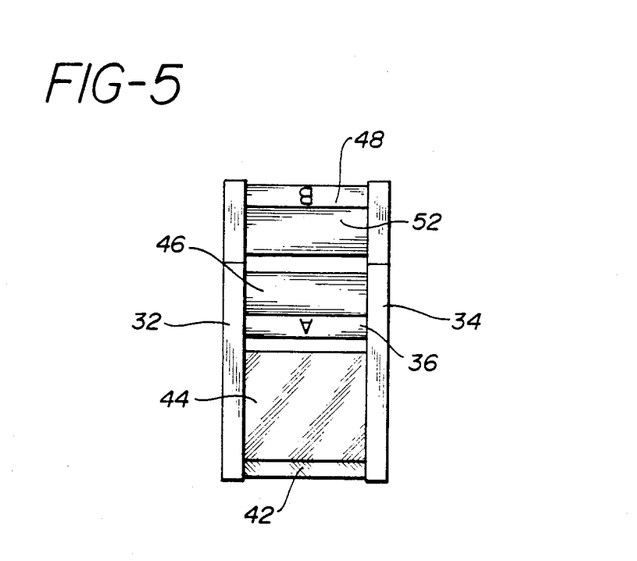
FIG. 5 is a side view of the beam diverting means, as seen looking generally left to right in FIG. 2.

It will be appreciated that the lateral displacement of the stationary reference beam 10' produced by refraction at surfaces 38 and 46 of element 36 produces a beam 10' parallel to primary beam 40 only if surfaces 38 and 46 are truly parallel. If, however, these surfaces are not parallel, then beam 10' will emerge from element 36 at an angle with respect to beam 40. To compensate for such an error in the direction of the beam 10', the third beam deflecting element 48 and the first beam deflecting element 36 are cut from the same sheet of material 54 as depicted in FIG. 4 (sheet 54 is shown as almost cut completely at 56). The opposite ends of the sheet 54 are labeled "A" and "B" to facilitate proper orientation of the elements 36 and 48 in the beam diverting means 16. After the cutting operation, surface 38 receives a coating to render it partially reflective and partially transmissive. Surfaces 50 and 52 are coated with a nonreflective coating to enhance transmissivity of the element 48. Next, the elements 36 and 48 are reoriented by rotating the third beam deflecting element 48 with respect to the first beam deflecting element 36 by approximately 180° in the plane of the surfaces 50 and 52. The element 36 and 48 are then positioned between side frame elements 32 and 34 in the orientation shown in FIG. 5. By this arrangement, a slight wedge in the sheet of material 54, that is, a nonparallelism between opposite surfaces, is compensated. Even with such a wedge, the laterally shifted and slightly diverging beam 10' emerging from the element 36 is laterally shifted by element 48, and returned to substantial parallelism with beam 40, as well. In this arrangement, correction can be useful if the surfaces 50 and 52, and the surfaces 38 and 46 are parallel to within approximately ten to fifteen minutes. This correction is effected regardless of the orientation of the wedge in the sheet 54.

By the present invention, a primary laser beam is split into two beams, a stationary reference beam and a moving reference beam which rotates about an axis parallel to the stationary reference beam so as to define a plane substantially normal thereto. The present invention has a number of advantages in many construction applications, such as in the layout of perpendicular walls. This invention eliminates the difficulties previously encountered with prior art devices of the type including removable, rotating prisms, where misalignment would occur during removal of a prism.

Having described the invention in detail and by reference to preferred embodiments thereof, it will be apparent that modifications and variations are possible without departing from the scope of the invention defined in the appended claims.

What is claimed is:

1. Apparatus for projecting a light beam to provide a plurality of reference beams, comprising:
    means for providing a primary light beam in an initial path,
    beam diverting means for intercepting said primary beam and permitting a portion of said primary beam to pass therethrough and emerge from said apparatus as a stationary reference beam, and for simultaneously diverting the rest of said primary beam in a direction which is substantially perpendicular to said initial path of said primary beam, and
    means for rotating said beam diverting means about an axis which is generally parallel to said initial path, whereby said rest of said primary beam rotates about an axis defined by said stationary reference beam and thereby produces a moving reference beam defining a plane which is normal to said stationary reference beam and to said initial path of said primary light beam.

2. The apparatus of claim 1 in which said beam diverting means comprises:
    a first beam deflecting element, defining a first reflection surface oriented at an angle with respect to said initial path of said primary beam, for reflecting a part of said primary beam, and
    a second beam deflecting element, defining a second reflection surface oriented at an angle of approximately 45° with respect to said first reflection surface, for reflecting said part of said primary beam which is reflected by said first beam deflecting element in a direction substantially perpendicular to said initial path of said primary beam.

3. The apparatus of claim 2 in which said first element is partially reflective and partially transmissive, such that a portion of said primary beam passes therethrough as said stationary reference beam.

4. The apparatus of claim 3 in which said first element is approximately 70% reflective and 30% transmissive.

5. The apparatus of claim 2 in which said beam diverting means further comprises a third beam deflecting element which is substantially transmissive and which is positioned in the path of said stationary reference beam to compensate for error in the stationary reference beam position produced by said first element.

6. The apparatus of claim 5 in which said third beam deflecting element defines a pair of substantially parallel surfaces through which said stationary reference beam passes, and in which said parallel surfaces are oriented at an angle with respect to said first reflection surface.

7. The apparatus of claim 6 in which said first and third beam deflecting elements are cut from the same sheet of material and reoriented after cutting by rotation of said third beam deflecting element with respect to said first beam deflecting element by approximately 180° in the plane of said pair of substantially parallel surfaces, whereby any error in beam direction introduced by a slight wedge in said sheet of material is compensated.

8. The apparatus of claim 6 in which said pair of substantially parallel surfaces are coated with a nonreflective coating to enhance transmissivity.

9. The apparatus of claim 2 in which said beam diverting means comprises:
    a first mirror having a reflection surface which is partially reflective and partially transmissive and a second surface which is substantially parallel to said reflection surface, said first mirror being positioned in said initial path of said primary beam at an angle to reflect part of said primary beam while permitting the rest of said primary beam to pass therethrough as said stationary reference beam,
    a second mirror having a reflection surface which is fully reflective, said second mirror being positioned in the path of the part of said primary beam reflected by said first mirror and is oriented with said reflection surface thereof at an angle of substantially 45° with respect to the reflection surface of said first mirror, whereby said part of said primary beam is reflected in a direction substantially perpendicular to the initial path of said primary beam, and a transmissive element defining a pair of substantially parallel surfaces, said transmissive element positioned in the path of said stationary reference beam and is oriented with said substantially parallel surfaces at an angle with respect to the reflection surface of said first mirror, whereby said transmissive element compensates for error in the position of said stationary beam produced by said first mirror.

10. The apparatus of claim 9 in which said first mirror and said transmissive element are cut from the same sheet of material and reoriented after cutting by rotation of said transmissive element with respect to said first mirror by approximately 180° in the plane of said pair of substantially parallel surfaces, whereby any error in the direction of said stationary reference beam introduced by a slight wedge in said sheet of material is compensated.

11. A method of providing a plurality of reference beams, comprising the steps of:

providing a primary light beam, diverting a portion of said primary light beam in a direction which is substantially perpendicular to said primary light beam while permitting the rest of said primary light beam to continue in its original direction as a stationary reference beam, and simultaneously rotating the diverted portion of said primary light beam to provide a moving reference beam which defines a plane substantially normal to said stationary reference beam.

12. The method of claim 11 in which the step of diverting a portion of said primary light beam includes the steps of:

positioning a partially transmissive mirror in the path of said primary light beam so as to reflect said portion of said primary light beam while permitting the rest of said primary light beam to pass therethrough as said stationary reference beam, and correcting for positional error in said stationary reference beam, produced by said partially transmissive mirror, by positioning a transmissive element, having plane parallel surfaces, in the path of said stationary reference beam.

13. The method of claim 12 in which said partially transmissive mirror and said transmissive element are cut from the same sheet of material and reoriented after cutting by rotation of said transmissive element with respect to said partially transmissive mirror by approximately 180° in the plane of said plane parallel surfaces, whereby error in beam direction introduced by any slight wedge in said sheet of material is compenstated.

14. The method of claim 12 in which said partially transmissive mirror is approximately 70% reflective and 30% transmissive.

* * * * *

UNITED STATES PATENT AND TRADEMARK OFFICE
CERTIFICATE OF CORRECTION

PATENT NO. : 4,676,598

DATED : June 30, 1987

INVENTOR(S) : Theodore J. Markley

Page 1 of 2

It is certified that error appears in the above-identified patent and that said Letters Patent is hereby corrected as shown below:

Figure 3 of the drawing should be deleted to be replaced with figure 3 as shown on the attached sheet.

UNITED STATES PATENT AND TRADEMARK OFFICE
CERTIFICATE OF CORRECTION

PATENT NO. : 4,676,598

DATED : June 30, 1987

INVENTOR(S) : Markley et al

It is certified that error appears in the above-identified patent and that said Letters Patent is hereby corrected as shown below:

FIG. 3

Signed and Sealed this

Eighth Day of December, 1987

Attest:

DONALD J. QUIGG

Attesting Officer

Commissioner of Patents and Trademarks

REEXAMINATION CERTIFICATE (2887th)

United States Patent [19]
Markley et al.

[11] B1 4,676,598
[45] Certificate Issued  May 21, 1996

[54] MULTIPLE REFERENCE LASER BEAM APPARATUS

[75] Inventors: Theodore J. Markley, Vandalia; Richard J. Omlor, Englewood; William K. Vatter, Springfield; Mark D. Sobottke, Kettering, all of Ohio

[73] Assignee: Spectra-Physics Laserplane, Inc., Dayton, Ohio

Reexamination Request:
No. 90/003,953, Sep. 11, 1995

Reexamination Certificate for:
Patent No.: 4,676,598
Issued: Jun. 30, 1987
Appl. No.: 734,325
Filed: May 15, 1985

Certificate of Correction issued Dec. 8, 1987.

[51] Int. Cl.⁶ .......................... G02B 27/14; G01C 15/00
[52] U.S. Cl. .......................... 359/212; 33/286; 359/223; 359/618; 359/629; 359/839
[58] Field of Search .................... 359/618, 629, 359/639, 212, 223, 839; 356/138, 148, 153, 247, 248; 33/281, 285, 286, 290

[56] References Cited

U.S. PATENT DOCUMENTS

| | | | |
|---|---|---|---|
| 2,136,995 | 11/1938 | Rinkel | 356/149 |
| 3,817,624 | 6/1974 | Martin | 356/138 |
| 3,822,943 | 7/1974 | Mason | 356/138 |
| 3,892,475 | 7/1975 | Bardocz | 359/225 |
| 3,897,637 | 8/1975 | Genho | 33/227 |
| 4,031,629 | 6/1977 | Paluck | 33/290 |
| 4,035,084 | 7/1977 | Ramsay | 356/152 |
| 4,043,679 | 8/1977 | George et al. | 356/249 |
| 4,062,634 | 12/1977 | Rando et al. | 356/248 |
| 4,111,564 | 9/1978 | Trice, Jr. | 356/247 |
| 4,135,823 | 1/1979 | Horvallius | 356/148 |
| 4,183,667 | 1/1980 | Denton | 356/250 |
| 4,206,550 | 1/1980 | Boyett et al. | 33/286 |
| 4,221,483 | 9/1980 | Rando | 356/250 |
| 4,283,115 | 8/1981 | Fraissi | 359/629 |
| 4,330,212 | 5/1982 | Miller | 356/354 |
| 4,333,242 | 6/1982 | Genho, Sr. | 33/227 |
| 4,441,809 | 4/1984 | Dudley et al. | 356/1 |
| 4,448,528 | 5/1984 | McManus | 356/250 |
| 4,466,739 | 8/1984 | Kasner et al. | 356/138 |
| 4,471,530 | 9/1984 | Kirven | 33/174 R |
| 4,781,457 | 11/1988 | Hirano et al. | 356/250 |

FOREIGN PATENT DOCUMENTS

481644  5/1916  France.

OTHER PUBLICATIONS

Levin et al., *An Instrument for Checking the Rectilinearity and Axial Alignment of Large Scale Products*, Aug. 1974, vol. 17, No. 8, pp. 1173–1175.

"Operating Manual Model 842—Rotolite Building Laser"; Spectra–Physics, Inc.; pp. 1–21.

"The Rotolite Building Laser"; Spectra–Physics; Dec., 1975.

*Primary Examiner*—Scott J. Sugarman

[57] ABSTRACT

Apparatus for projecting a laser beam to provide simultaneously a stationary reference beam and a moving reference beam, which rotates in a plane mormal to the stationary reference beam, includes a beam diverting arrangement for intercepting a primary beam and for splitting the beam into the two reference beams. The beam diverting arrangement includes first and second deflecting elements which deflect the beam by 90° with respect to the primary beam. A portion of the primary beam, striking the first deflecting element, passes through the element and is shifted slightly by refraction. This shift is compensated by a third beam deflecting element which is fully transmissive, and which refracts the stationary reference beam into alignment with the primary beam. By cutting the first and third deflection elements from the same sheet of material and reorienting the elements appropriately, slight deviation from parallelism in the opposing surfaces of the sheet of material are compensated.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *